Inventor
Laurens Hammond

Patented May 1, 1951

2,550,806

UNITED STATES PATENT OFFICE 2,550,806

AIRCRAFT FLIGHT CONTROL APPARATUS

Laurens Hammond, Chicago, Ill., assignor to Hammond Instrument Company, Chicago, Ill., a corporation of Delaware Application November 26, 1945, Serial No. 630,861

3 Claims. (Cl. 244—79)

My invention relates generally to aircraft flight control apparatus and more particularly to automatic pilot controls for so-called "flying wing" and similarly operated aircraft.

Flying wing aircraft are characterized by the fact that they do not have the conventional elevator, rudder, and ailerons but instead are provided with two aerodynamic control surfaces termed "elevons" which function to take the place of both of the elevator and ailerons. In order to control the attitude of the flying wing airplane and to control its direction of flight, it is necessary to operate the elevons in a coordinated manner. This has been accomplished in the past by a mechanical inter-linkage between the elevons and the servomotor or manual control, usually including a differential mechanism or linkage, in a manner such that both elevons may be elevated, both lowered, or that either elevon may be elevated while the other is lowered.

In certain designs of flying wing airplanes and gliders such inter-linkage between the elevons is necessarily complicated, and therefore undesirable, because it is necessary for the control mechanism to have some kind of mechanical linkage extending across the longitudinal axis of the airplane. Such mechanical linkage between the two elevons may have to be long and circuitous in order to pass around intervening engine nacelles, jet propulsion tubes, and other component parts of the airplane. To overcome these difficulties I have provided a flight control apparatus for flying wing and similarly controlled aircraft in which there need be no connection whatever between the servomotors for operating the two elevons, or at most, there need be but an electrical connection across the longitudinal axis of the airplane.

It is therefore an object of my invention to provide an improved automatic control apparatus for flying wing aircraft.

It is a further object to provide an improved automatic gyropilot and controls for the elevons of a flying wing airplane.

A further object is to provide an improved method of controlling the flight of flying wing and similarly operated aircraft.

A further object is to provide an improved aerodynamic flight control apparatus for aircraft, which is simple in construction, will be sensitive in operation and may be economically produced.

Figure 1:
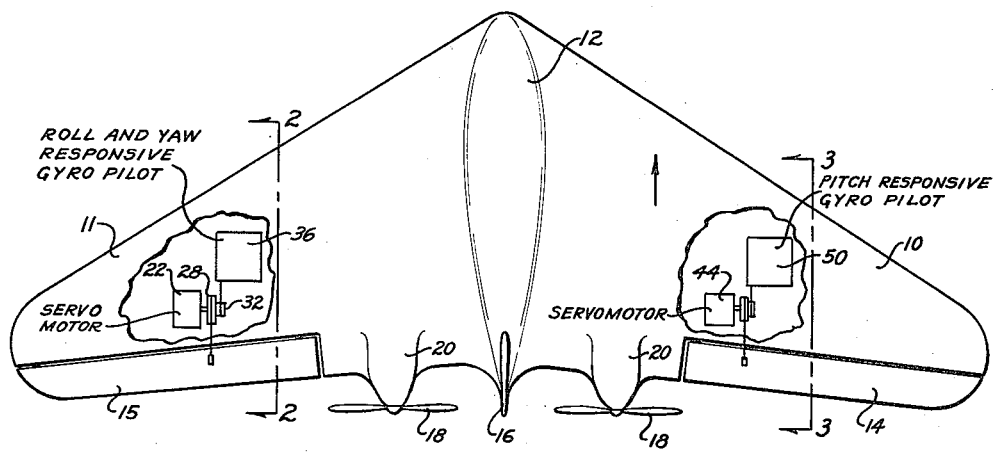
Figure 2:
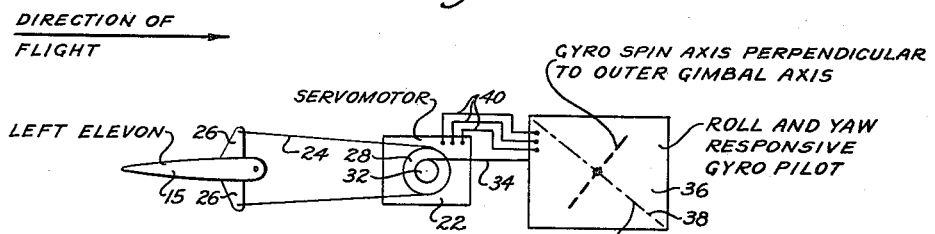
Figure 3:
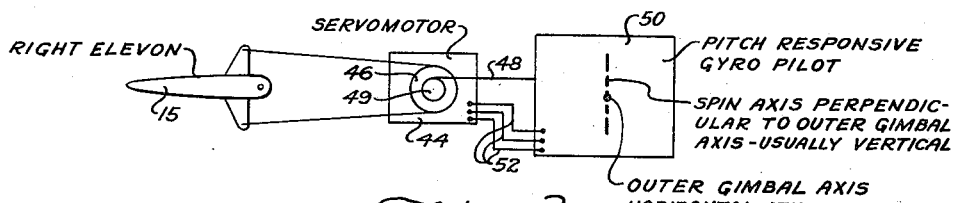

Other objects will appear from the following description, reference being had to the accompanying drawings in which:

Figure 1 is a more or less diagrammatic plan view of a flying wing aircraft, portions of the upper wing surface being broken away to show parts of the control; and Figures 2 and 3 are diagrammatic representations of sectional views taken on the lines 2—2 and 3—3 respectively of Fig. 1.

As shown in Fig. 1 the flying wing airplane comprises a right wing 10, and a left wing 11 which are substantially integral but may be joined by a fuselage portion 12. The right wing 10 is provided with an elevon 14 whereas the left wing 11 is provided with a similar elevon 15. The aircraft is illustrated as having a vestigial vertical fin 16 and is shown as being propelled by a pair of propellers 18 driven by suitable engines contained in nacelles 20. It will be understood that the flying wing airplane may be jet propelled and thus provided with one or more jet tubes in place of the engine driven propellers 18.

The left elevon 15, as best shown in Fig. 2 is operated by a servomotor 22 through a cable 24, the ends of which are suitably secured to the arms 26 fixed to the elevon 15, the cable 24 being wrapped several times around a pulley 28 which is oscillated by the servomotor 22. The servomotor may be of any pneumatic or hydraulic type or may be of an electric motor driven type in which the motor is continuously operating in either one direction or the other, depending upon the condition of the control circuit therefor, the reversals of the direction of rotation of the motor taking place very frequently, in the order of two or three times per second.

A follow-up pulley 32 is secured to the pulley 28 and has a cable 34 secured thereto, this cable being part of a follow-up mechanism forming part of a gyropilot control assembly 36. The gyropilot assembly 36 may be of any conventional type comprising a spinning gyro wheel mounted in inner and outer gimbals in the conventional manner. The gyropilot assembly is mounted in the aircraft with the pivotal axis of the outer gimbal fore and aft with the after end elevated above the forward end at a substantial angle, for example 45° so as to be responsive to both roll and yaw of the airplane. The gyro is fitted with some form of self-erecting mechanism to maintain the spin axis perpendicular to the outer gimbal axis. This is an arrangement well known for the operation of ailerons, and may be of the type shown in my copending applications, Serial Nos. 463,642 and 463,643, filed October 28, 1942, and which have matured into Patents Nos. 2,408,929 and 2,517,786 respectively.

The function of the follow-up mechanism is to cause the elevon to oscillate about a mid-position which differs from its normal position by an amount which is at all times proportional to the displacement of the aircraft about the axis of the outer gimbal of the gyro. The axis of the outer gimbal of the gyro is indicated by the dot-dash line 38 as being at an angle of 45° with respect to the horizontal, although the degree of inclination may vary considerably, as between 20 and 70 degrees, depending upon the aerodynamic characteristics of the airplane and its controls. The electrical controls for the servomotor 22 are diagrammatically illustrated as comprising a plurality of conductors 40, connecting the gyropilot 36 to the servomotor 22. The gyropilot mechanism 36 is of such construction that current is supplied to the servomotor 22 through the conductors 40 to rotate the latter alternately clockwise and counter-clockwise for equal intervals of time in the order of one third of a second when the airplane is neither yawing nor rolling, but is arranged to cause the servomotor 22 to operate the elevon 15 in the direction necessary to cause the airplane to reassume non-rolling, non-yawing flight upon the initial commencement of a roll or yaw, such movement of the elevon being effected by causing the servomotor 22 to rotate in one direction for a greater part of the time than it rotates in the opposite direction.

The right elevon 14 is operated in a manner similar to the elevon 15 by a servomotor 44 driving the elevon operating pulley 46 through a suitable speed reducing gearing. A follow-up cable 48 has one end secured to a pulley 49, which turns with the pulley 46, and has its other end leading to a pitch responsive gyropilot mechanism 50. The gyropilot mechanism 50 may be of any well known construction, such as shown, for example, in my aforesaid patents. It is mounted with its outer gimbal axis horizontal and athwartship, and depending on the type of gyro used, it would normally have its spin axis vertical and be of the self-erecting type. The pitch responsive gyropilot apparatus is electrically connected to the servomotor 44 in a suitable manner, as by conductors 52, and operates to cause the servomotor 44 to swing the elevon 14 upwardly or downwardly at a relatively slow rate in a direction to compensate for changes in pitching attitude.

To understand the method of operation of the apparatus it will be described as it operates under several assumed conditions.

Let us assume that the airplane is in level flight and, due to some atmospheric or other disturbance, it begins to nose down. The gyro apparatus 50 will thereupon operate in a manner to cause to servomotor 44 to be energized in a direction to cause the right elevon 14 to swing upwardly about its pivotal mounting. This movement of the elevon 14 will tend to bring the nose up in the right direction. However, it also tends to cause the airplane to roll to the right, the right wing moving downwardly. At the inception of such roll the gyro apparatus 36, which is responsive to roll, causes the left elevon 15 rapidly to move up to the extent necessary to prevent the roll from taking place to any appreciable extent. Thus both elevons will be raised and will tend to bring the nose of the plane up. It will thus appear that a correction in the right elevon results in a corresponding correction in the left elevon, and that the combined effect of the positions of both elevons results in the desired change in pitch.

The tendency to bring the nose of the plane up will continue until the longitudinal axis of the airplane is again horizontal, at which time the right elevon will have returned to its mid-position, the left elevon 15 will be oscillated rapidly through a very small angle about its mid-position, and the airplane will then again be on an even keel without a roll or yaw.

If the disturbance is one which causes the airplane to nose up, such change in pitch will result in operation of the control apparatus in a direction exactly the reverse of that described in the two preceding paragraphs.

If the disturbance is one which tends to cause the airplane to roll, the gyropilot apparatus 36 will immediately control the servomotor 22, causing it to move the elevon 15 rapidly in a direction to oppose the incipient roll.

Similarly, if the airplane begins to yaw, the gyropilot apparatus 36 will operate through the servomotor 22 to swing the elevon 15 in a direction to initiate a slight roll, the roll causing the airplane to bank and turn in a direction to take it out of its yawing flight. As soon as the yaw has been eliminated, the elevon 15 will be returned to slight oscillation about its mid-position so as to cause the airplane to reassume flight without yawing.

While I have shown and described a single embodiment of my invention, it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

I claim:

1. In an apparatus for controlling the flight of an airplane designed for control through two elevons, the combination of a gyro apparatus responsive to rolling and yawing of the airplane, a servomotor controlled thereby, operating connections between the servomotor and one of the elevons to cause the latter to be operated rapidly in a direction to correct for roll and yaw of the airplane, and means for controlling the other elevon independently of roll and yaw.

2. In an apparatus for controlling the flight of an airplane designed for control through two elevons, the combination of a gyro apparatus responsive to rolling and yawing of the airplane, a servomotor controlled thereby, operating connections between the servomotor and one of the elevons to cause the latter to be operated rapidly in a direction to correct for roll or yaw of the airplane, a gyropilot apparatus responsive to changes in pitch of the aircraft, a second servomotor controlled thereby, and operating connections between said second servomotor and the other elevon to cause the latter to move relatively slowly in a direction to compensate for incipient changes in pitch.

3. In an apparatus for controlling the flight of an airplane designed for control by two elevons, the combination of a gyro apparatus responsive to rolling and yawing of the airplane, means controlled by the gyro apparatus to move one of the elevons rapidly to a position to correct for incipient roll and yaw, means responsive to changes in pitch of the airplane, and mechanism controlled by said last named means to move the other elevon in a direction to correct for incipient changes in pitch.

LAURENS HAMMOND.

REFERENCES CITED

The following references are of record in the file of this patent:

UNITED STATES PATENTS

| Number | Name | Date |
|---|---|---|
| 1,707,690 | Sperry | Apr. 2, 1929 |
| 2,153,667 | Hoekstra | Apr. 11, 1939 |
| 2,191,842 | Back | Feb. 27, 1940 |
| 2,199,256 | DeFlorez | Apr. 30, 1940 |
| 2,318,833 | Stambach | May 11, 1943 |
| 2,405,015 | Carlson | July 30, 1946 |
| 2,412,647 | Northrop et al. | Dec. 17, 1946 |